United States Patent
Birke

(10) Patent No.: US 6,747,726 B1
(45) Date of Patent: Jun. 8, 2004

(54) LIQUID CRYSTAL DISPLAY WITH REFLECTIVE SUPPORT MEMBER AND HEATING DEVICE

(75) Inventor: Lars Birke, Radolfzell-Böhringen (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/979,582

(22) PCT Filed: Mar. 22, 2000

(86) PCT No.: PCT/DE00/00879

§ 371 (c)(1),
(2), (4) Date: Mar. 14, 2002

(87) PCT Pub. No.: WO00/70396

PCT Pub. Date: Nov. 23, 2000

(30) Foreign Application Priority Data

May 14, 1999 (DE) .......................................... 199 22 369

(51) Int. Cl.⁷ ............................................. G02F 1/1333
(52) U.S. Cl. .......................... 349/161; 349/58; 349/113; 349/114
(58) Field of Search .............................. 349/56, 58, 113, 349/114, 161

(56) References Cited

U.S. PATENT DOCUMENTS

| | | | | |
|---|---|---|---|---|
| 4,623,222 A | * | 11/1986 | Itoh et al. ................... | 349/195 |
| 4,643,525 A | * | 2/1987 | Haim ......................... | 349/161 |
| 4,907,859 A | * | 3/1990 | Takada et al. ............... | 349/161 |
| 5,680,191 A | * | 10/1997 | Voisin et al. ................ | 349/150 |
| 5,886,763 A | * | 3/1999 | Wolkowicz et al. ......... | 349/161 |
| 6,128,053 A | * | 10/2000 | Brandt et al. ................. | 349/72 |

FOREIGN PATENT DOCUMENTS

| | | |
|---|---|---|
| DE | 33 28 339 A1 | 2/1985 |
| DE | 41 40 415 A1 | 6/1993 |
| DE | 44 17 990 A1 | 11/1995 |
| EP | 0 915 360 A2 | 5/1999 |

OTHER PUBLICATIONS

EP 0 915 360 A3– May 12, 1999– European Search Report.

* cited by examiner

Primary Examiner—Tarifur R. Chowdhury
Assistant Examiner—Michael H Caley
(74) Attorney, Agent, or Firm—Fay, Sharpe, Fagan, Minnich & McKee, LLP

(57) ABSTRACT

The invention relates to a liquid crystal display, whereby a housing thereof contains a display (1) which functions as a liquid crystal cell, a support (2) which is configured as a reflector and a heating device for the display. According to the invention, the heating device is a metallic layer (8) which is applied directly to the support (2).

13 Claims, 2 Drawing Sheets

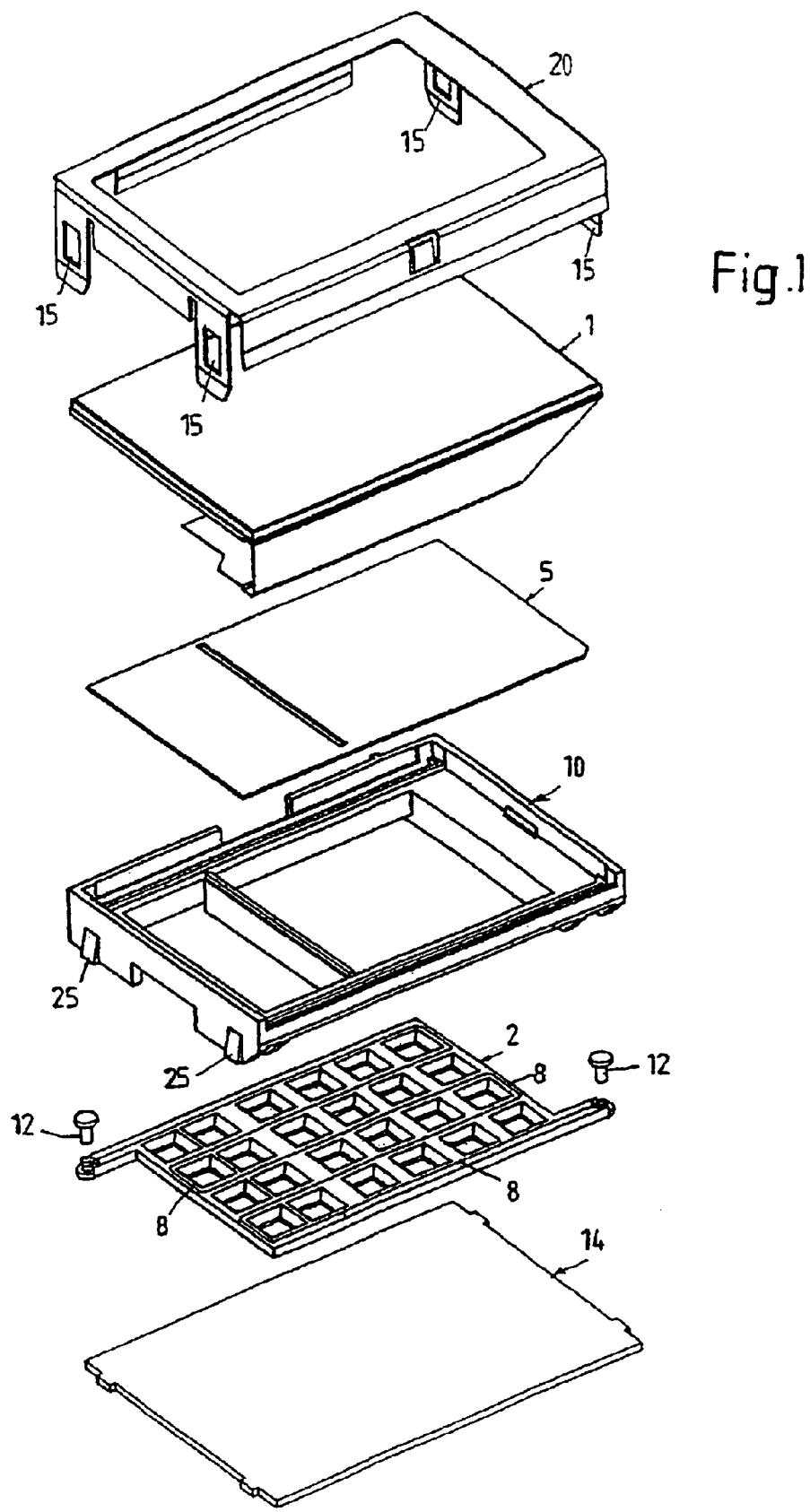

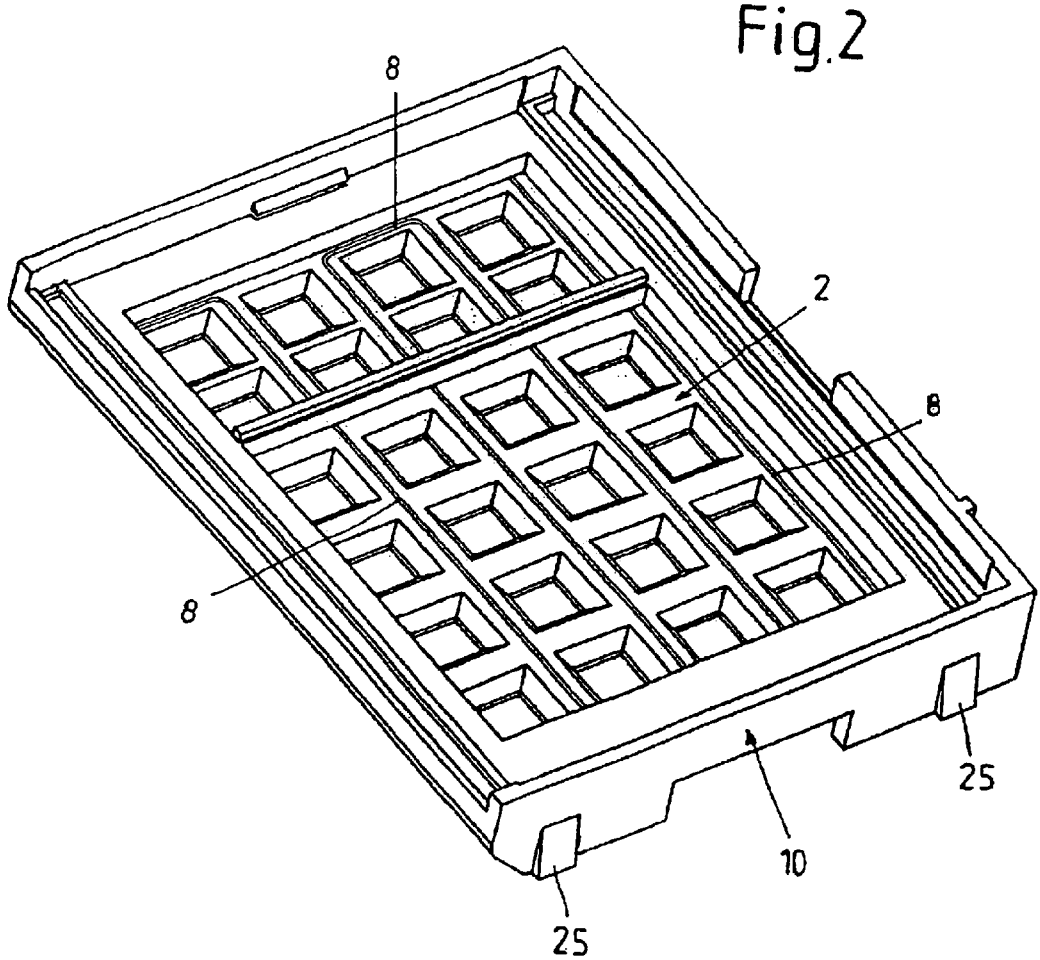

LIQUID CRYSTAL DISPLAY WITH REFLECTIVE SUPPORT MEMBER AND HEATING DEVICE

The invention relates to a liquid crystal cell which functions as a display, whereby a housing thereof contains a support which is configured as a reflector and a heating device for the display.

This type of liquid crystal display is already known in the state of the art (DE 44 17 990 A1) for which a light box is arranged behind a liquid crystal cell, said light box being bordered at its reverse side by a conductor plate which has lights. Between the lights and the liquid crystal cell is located a heating wire, so that the liquid crystal cell can be heated if temperatures are too low.

Further state of the art is a liquid crystal display whose liquid crystal cell has a transparent thin layer heating unit (DE 41 40 415 A1).

Both known liquid crystal displays have in common that high construction expenditures are required in order to assure that the liquid crystal cell is also heated at low temperatures.

The most proximate state of the art is a liquid crystal display with a liquid crystal cell functioning as display, as well as a support configured as a support and a heating device for the display (U.S. Pat. No. 4,643,525). Said heating device is constructed relatively complicated and costly.

In addition, a display device is known (EP-A-0 15 360) for which a heating device is arranged in the cell space of the liquid crystal cell, directly or indirectly on the anterior and/or the posterior cell wall, whereby, likewise, significant construction expense is required for mounting said heating device.

Accordingly, the present invention is based on the object of creating a liquid crystal cell functioning as display, whereby said cell can be heated, even at low temperatures, with low constructional expense.

Said object is solved according to one specific embodiment of the invention is that the heating device is a metallic layer applied directly onto the support and that the metallic layer is produced by coating the support made of plastic with a bonding layer, namely a primer, and by subsequent galvanic coating.

Alternatively, for solving said object, there exists the possibility that for manufacturing the metallic layer it is possible to undertake coating a foil with a bonding layer with subsequent galvanic coating, as well as deep-drawing and rear-spraying of the foil. The metallic layer hereby beneficially serves as resistance heating. By means of this type of metallic layer, which is applied directly onto the support, no additional components need to be mounted.

In order to provide the support with the metallic layer, it is possible to employ the following methods:

1. Coating of the support functioning as reflector with a bonding layer (primer) and with subsequent galvanic coating,
2. Coating of a foil with a bonding layer (primer) and subsequent galvanic coating, deep-drawing of the foil and subsequent rear-spraying of the foil in the support,
3. Manufacturing of the support from a metallizable and a non-metallizable plastic, with subsequent partial chemical metallization of the support. The manufacture of the support from the two kinds of plastic can be done for example by two-component extrusion method.
4. Radiation of a plastic component with a short-wave, ultra-violet light of an Excimer lamp or an Excimer Laser; immersion of the radiated plastic in a watery solution with subsequent additional baths. The layers applied in this fashion can be electrically contacted and galvanically reinforced to thickness customary for conductor tracks.

The galvanic coating with respect to the first-named of the second method can consist, for example, of copper.

In further embodiment of the invention, contacting can be effected either by means of pins injected into the support, preferably made of metal, or directly via metallized plastic surfaces, which are soldered together with the conductor plate.

In further embodiment of the invention, there exists the possibility that the housing and the support equipped with the metallic layer as heating device are designed as a single piece, which results in substantial simplification in the design and reduction in costs.

In the following, the invention is described in more detail making use of specific embodiments represented in the drawing. The drawing shows as follows:

FIG. 1 an oblique view of the various elements of the liquid crystal display;

FIG. 2 another embodiment possibility of a single piece version of the liquid crystal display.

In accordance with the graphic representation according to FIG. 1, inside a housing 10 are arranged a liquid crystal cell functioning as display 10, and a support 2, functioning as reflector. Underneath the display 1 may be located a dispersion foil 5, which likewise is arranged in the housing. Housing 10 is closed above a frame 20, for example by means of recesses 15 of frame 20, which are clipped together with catch tongues 25 at the outside of housing 10. On support 2 which functions as reflector, is located a heating device, which is designed as metallic layer 8, applied directly onto support 2. In addition, a conductor plate 14 is provided. The metallic layer can be produced by coating the support 2, made of plastic, with a bonding layer and by subsequent galvanic coating. The galvanic coating can consist, for example, of copper.

Another manufacturing possibility for the metallic layer is offered in that a foil is coated with a bonding layer and subsequently galvanically treated, whereby, after that, the foil is deep-drawn and connected with support 2 by rear-spraying.

Another manufacturing possibility for the metallic layer is offered in that the support can be produced for example by two-component spray process from a metal-coatable plastic and a metal non-coatable plastic, with subsequent partial chemical metal-coating of the support.

Alternatively, the possibility also exists that certain locations of the plastic element are radiated with a short-wave ultraviolet light of an Excimer lamp or an Excimer Laser. Subsequent thereto, the plastic is immersed in a watery solution, whereby in further baths, within a brief period of time, develops a continuous copper- or nickel layer. These layers can be electrically contacted and galvanically reinforced to customary thickness for conductor tracks.

The metallic layer 8 can be equipped with contact pins injected into the support 2, which are designed, for example, as metal pins. Another possibility exists in that the contacting is effected directly via metallized plastic surfaces, which are soldered together with the conductor plate.

According to FIG. 2, there also exists the possibility of a single-piece version of the liquid crystal display. In this instance, the conductor plate or the housing 10 is connected as single piece with the support 2, whereby said support 2 in turn presents, similar as for the embodiment according to FIG. 1, a metallic layer 8, which, similar to the embodiment according to FIG. 1, forms a heating device.

Due to the circumstance that the heating device is a metallic layer 8 applied directly onto the support 2, there results significant simplification of the entire unit and a reduction in costs, since no additional components have to be installed.

What is claimed is:

1. A liquid crystal display comprising:
   a housing;
   a liquid crystal cell functioning as display, disposed on said housing;
   a plastic support configured as reflector; and,
   a heating device for the display, the heating device including a metallic layer applied directly onto the support, the metallic layer being formed by coating the plastic support with a primer bonding layer followed by a subsequent galvanic coating.

2. The display apparatus according to claim 1, wherein:
   the support consists of metal-coatable and metal non-coatable plastic, and the metal-coatable plastic is in part chemically metallized.

3. The display apparatus according to claim 1 further including at least one of:
   contact pins injected into the support contacting the metallic layer; and,
   metallized plastic surfaces soldered together with a conductor plate.

4. The display apparatus according to claim 1 wherein:
   the housing and the support, equipped with the metallic layer as heating device, are a single-piece component.

5. The display apparatus according to claim 1, wherein:
   the plastic support is irradiated with a short-wave ultraviolet light of an excimer lamp or an excimer laser and immersed in a water solution.

6. The display apparatus according to claim 5, further including:
   a galvanic reinforcement of the metallic layer.

7. The display apparatus according to claim 1, wherein the galvanic coating is copper.

8. A display apparatus comprising:
   a housing:
   a liquid crystal cell functioning as display and disposed on said housing;
   a support configured as reflector; and,
   a heating device for the display, the heating device including a metallic layer applied directly onto the support, the metallic layer being a foil coated with a galvanic bonding layer by deep-drawing and connected with the support by rear-spraying of the foil.

9. The display apparatus according to claim 8, wherein:
   the galvanic coating is copper.

10. The display apparatus according to claim 8 further including at least one of:
    contact pins injected into the support contacting the metallic layer; and,
    metallized plastic surfaces soldered together with a conductor plate.

11. The display apparatus according to claim 8, wherein the housing and the support, equipped with the metallic layer as heating device, are a single-piece component.

12. A method of forming a heated liquid crystal display comprising:
    providing a liquid crystal cell functioning as a display;
    providing a plastic support configured as a reflector and being adapted to receive said liquid crystal cell; and
    applying a metallic layer directly onto said support as a heating device for heating said liquid crystal cell, the applying including coating selected portions of the plastic support with a primer bonding layer and then subsequently galvanic coating the primer bonding layer.

13. A method of forming a heated liquid crystal display comprising:
    providing a liquid crystal cell functioning as a display;
    providing a plastic support configured as a reflector and being adapted to receive said liquid crystal cell; and
    applying a metallic layer directly onto said support as a heating device for heating said liquid crystal cell, the applying including coating a foil with a primer layer, subjecting the foil to a galvanic treatment, deep-drawing the foil, and connecting he foil with the plastic support by rear-spraying.

* * * * *